United States Patent [19]

Schmidt

[11] Patent Number: 4,959,555
[45] Date of Patent: Sep. 25, 1990

[54] INTERCONNECTION MEDIUM

[75] Inventor: Douglas C. Schmidt, Summit, N.J.

[73] Assignee: AT&T Bell Laboratories, Murray Hill, N.J.

[21] Appl. No.: 345,274

[22] Filed: Apr. 27, 1989

[51] Int. Cl.⁵ .................. H01J 19/82; H03K 3/26
[52] U.S. Cl. .............................. 307/219; 307/303;
  307/443; 307/465; 340/825.1
[58] Field of Search ............ 340/825.1; 307/303,
  307/219, 443, 465

[56] References Cited

U.S. PATENT DOCUMENTS

| 3,940,740 | 2/1976 | Coontz | 361/104 |
| 4,354,217 | 10/1982 | Mahon | 340/166 R |
| 4,656,370 | 4/1987 | Kanuma | 307/219 |
| 4,849,657 | 7/1989 | Boisvert | 307/219 |

OTHER PUBLICATIONS

*IBM Technical Disclosure Bulletin*, "Capacitor for Single-FET Memory Cell", by C. V. Clarke and J. E. Tomko, vol. 17, No. 9, pp. 2579–2580, Feb. 1975.

Primary Examiner—Stanley D. Miller
Assistant Examiner—Margaret Rose Wambach
Attorney, Agent, or Firm—Lester H. Birnbaum

[57] ABSTRACT

Proposed is an interconnection medium which is tolerant of faults in at least one of the conductors. Redundancy is established to components connected to the medium by providing additional conductors and steering the signals between components to appropriate conductors in the event of a fault. Preferably, the conductors are arranged in a way which balances the amount of additional wiring and the amount of added parasitic loading.

4 Claims, 7 Drawing Sheets

INTERCONNECTION MEDIUM

BACKGROUND OF THE INVENTION

This invention relates to an interconnection medium for electrically connecting electronic components.

With the increasing complexity of systems employing semiconductor integrated circuits has come a corresponding complexity of the interconnection medium for electrically coupling separate ICs. This medium has traditionally taken the form of printed circuit boards. The technology, while adequate for present needs, may be insufficient for future systems requiring high speed operation and high density conductive patterns. Workers in the art, therefore, have been developing advance packaging designs including wafer scale integration where the interconnection medium is a silicon wafer with conductors formed according to integrated circuit processing techniques.

Whichever interconnection approach is used, but especially in the wafer scale technology, the presence of faults in the conductors will become increasingly significant. A single fault, whether an open or short, can render the interconnection medium unusable and yields, therefore, can be unacceptably low for complex circuits.

Proposals have been made for dealing with the problem of defective chips or memory cells by providing additional chips or cells which would be connected in the final circuit in the event of a defect in one or more of the original elements. (See, e.g. U.S. Pat. No. 3,940,740) issued to Coontz and U.S. Pat. No. 4,354,217 issued to Mahon). However, to the best of applicant's knowledge, workers in the art have not addressed the problem of defects in the interconnection medium which connects the various circuit chips together.

It is, therefore, an object of the invention to provide an interconnection medium which is tolerant of defects in the conductors making up the interconnection scheme.

SUMMARY OF THE INVENTION

This and other objects are achieved in accordance with the invention which is a circuit including an interconnection medium. The medium comprises a substrate and a plurality of conductors over a major surface of the substrate. The conductors are formed in a manner which provides electrical interconnection between components mounted to the medium. The invention is characterized by the inclusion of conductors between the same components which are in addition to the conductors needed to interconnect the components such that alternate conducting means are established between components in the event of a fault in one of the conductors needed to interconnect the components.

BRIEF DESCRIPTION OF THE DRAWING

These and other features of the invention are delineated in detail in the following description. In the drawing.

It will be appreciated that for purposes of illustration these figures are not necessarily drawn to scale.

DETAILED DESCRIPTION

Figure 1:
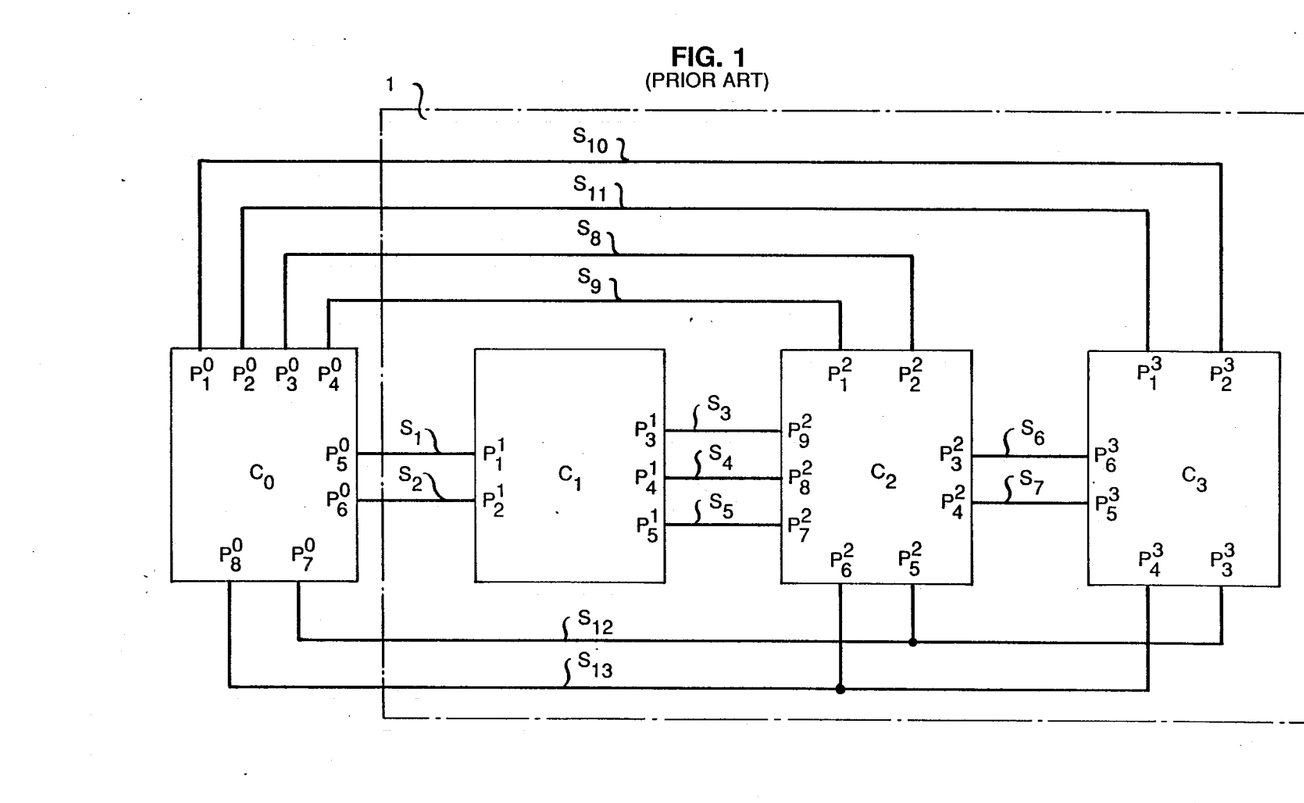
FIG. 1 is a schematic illustration of a circuit including interconnection in accordance with a typical prior art scheme.

FIG. 1 illustrates schematically how a simple circuit might be connected according to the prior art. Conductors $S_1$–$S_{13}$ are formed on the major surface of a substrate, 1, which typically can be an epoxy glass material, ceramic, or a silicon wafer, to provide the interconnection medium. The conductors are formed so as to provide electrical connection between circuitry off the substrate, illustrated by block $C_0$, and circuit components mounted to the substrate and illustrated as blocks $C_1$–$C_3$. These components are typically integrated circuit chips which are bonded to the conductors by well-known techniques such as soldering. The ports of each component are designated by P, with a superscript indicating the component to which it belongs and a subscript indicating the number of the port within the component. Thus, for example, outside ports $P_7^0$ and $P_8^0$ are electrically coupled to Ports $P_5^2$ and $P_6^2$ respectively, of component $C_2$ and also $P_3^3$ and $P_4^3$, respectively, of component $C_3$. Each port can be an input, and output, or a bidirectional port.

The circuit shown represents a fairly simple example of an interconnection scheme for the purposes of illustration. Typical circuits would include many more conductors, and possibly other components, depending on the complexity of the circuit. A single defect on one of the conductors, whether a short or open, could render the entire interconnection medium, 10, useless.

Figure 2:
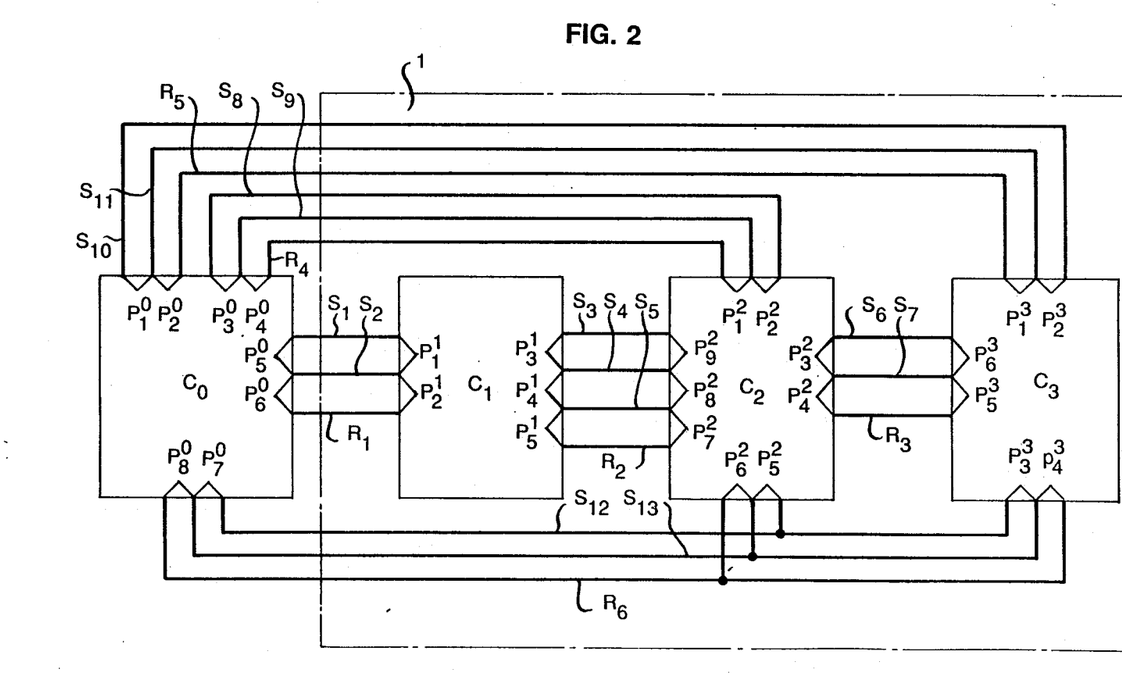
FIG. 2 is a schematic illustration of a circuit including interconnections in accordance with a first embodiment of the invention.

FIG. 2 illustrates a solution to the problem in accordance with one embodiment of the invention. An additional conductor ($R_1$–$R_6$) is provided adjacent to each set of conductors coupled to a particular set of components. Thus, for example, the conductor $R_6$ is added adjacent to conductors $S_{12}$ and $S_{13}$ in order to connect the same components as $S_{12}$ and $S_{13}$ ($C_0$, $C_2$, $C_3$). Similarly, conductor $R_4$ is added adjacent to conductors $S_8$ and $S_9$ to connect components $C_0$ and $C_2$, and conductor $R_5$ is added adjacent $S_{10}$ and $S_{11}$ to couple components $C_0$ and $C_3$. The same scheme is provided to interconnect $C_0$–$C_1$, $C_1$–$C_2$ and $C_2$–$C_3$. Each port is now provided with a steering mechanism, illustrated by the branch designations, which allows each port to be coupled to one of two conductors.

Redundancy is, therefore, established for each interconnection between a particular set of components. For example, if a defect were found to exist on conductor $S_{12}$ during testing of the circuit, the signal between ports $P_7^0$, $P_5^2$ and $P_3^3$ could be steered to conductor $S_{13}$. The signal between $P_8^0$, $P_6^2$ and $P_4^3$ is then steered to conductor $R_6$. The same type of steering could be utilized if a defect were discovered in any of the other conductors coupling another set of components.

Figure 3:
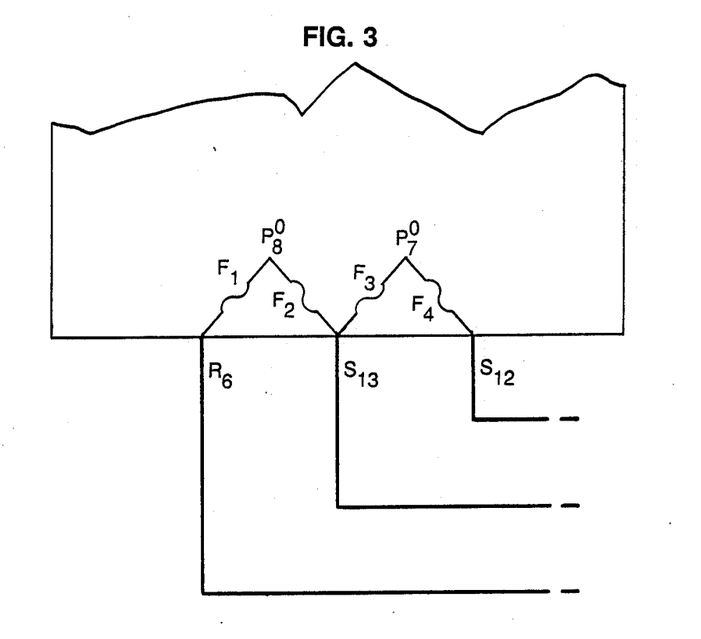
FIG. 3 is a schematic illustration of a portion of FIG. 2.

A particular type of steering mechanism which can be utilized with any of the embodiments described herein in illustrated schematically in FIG. 3. A fuse (e.g., $F_1$–$F_4$), is provided at each branch of the various ports (only $P_7^0$ and $P_8^0$ being shown in this figure). When it is desired to steer the signal to and from a port to a particular conductor, all that needs to be done is to open the fuse connecting the port to the other conductor. Thus, in the example already described, fuse $F_4$ would be opened to steer the signal from $P_7^0$ to conductor $S_{13}$ and fuse $F_2$ would be opened to steer the signal from $P_8^0$ to conductor $R_6$. The fuses can be simple conductive links which are opened by laser cutting or by any other cutting means. Although the steering mechanism is shown on the components, it could be supplied to the interconnection medium itself. Further, steering could be additive rather than subtractive by writing conductive links. between a port and the desired conductor as, for example, by standard printed wiring board repair techniques such as soldering additional wire to the board.

Figure 4:
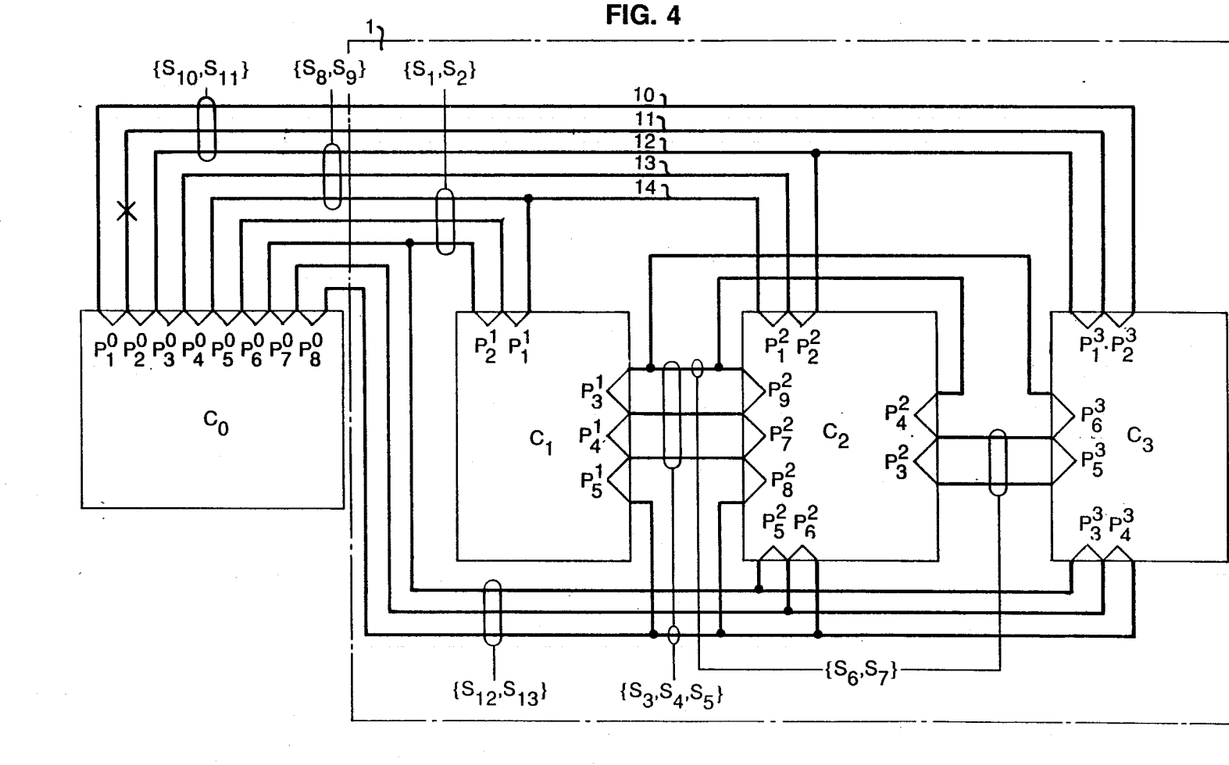
FIG. 4 is a schematic illustration of a circuit including interconnections in accordance with a further embodiment of the invention.

It will be appreciated that while the embodiment of FIG. 2 provides the requisite redundancy, it also introduces a number of additional conductors which may occupy too much space and increase power consumption in some complex circuits. It is possible, however, to provide the same redundancy without requiring an additional conductor for each set of conductors coupled to a particular set of components. This is accomplished by the concept of "sharing" a conductor between two adjacent sets of conductors. One example of such an approach is illustrated in FIG. 4. In this embodiment, before the steering of the signals, individual conductors which correspond to FIG. 1 cannot be identified. Consequently, sets of conductors $\{S_1, S_2\}$, $\{S_3, S_4, S_5\}$, $\{S_6, S_7\}$, $\{S_8, S_9\}$, $\{S_{10}, S_{11}\}$ and $\{S_{12}, S_{13}\}$ are identified, and some of the conductors are numbered 10–14. Each set of conductors includes a conductor (e.g., 12) which is "shared" with an adjacent set of conductors in that the conductor extends to the same set of the components as each of the adjacent sets of conductors and can be used to connect either set of components when the steering is effected. For example, the set of conductors $\{S_{10}, S_{11}\}$ includes two conductors (10,11) which extend between $C_0$ and $C_3$ and a conductor (12) which extends between $C_0$, $C_2$ and $C_3$. The adjacent set $\{S_8, S_9\}$ includes this shared conductor (12) as well as two conductors (13,14) which are coupled between components $C_0$ and $C_2$. (One of these two conductors (14) will also be coupled to $C_1$ since it is shared with the next adjacent set $\{S_1, S_2\}$.) Thus, for example, if there is a defect in the second conductor (11) of set $\{S_{10}, S_{11}\}$ as indicated by the "X", ports $P_1^0$ and $P_2^3$ will be steered to the first conductor (10) and be electrically coupled. Ports $P_2^0$ and $P_1^3$ are steered onto the shared conductor (12) to make contact. Ports $P_3^0$ and $P_2^2$ are then steered onto conductor 13, and ports $P_4^0$ and $P_1^2$ are steered onto conductor 14. All other ports will be steered similarly onto appropriate conductors to produce the electrical connection of FIG. 1 in the final circuit.

The advantage of this approach is that in general only one conductor is needed in addition to those necessary to connect the components in the prior art circuit of FIG. 1. However, circuit performance could be limited due to the additional parasitic loading resulting from the fact that too many conductors will physically extend to components which do not require electrical connection thereto in the final circuit.

Figure 5:
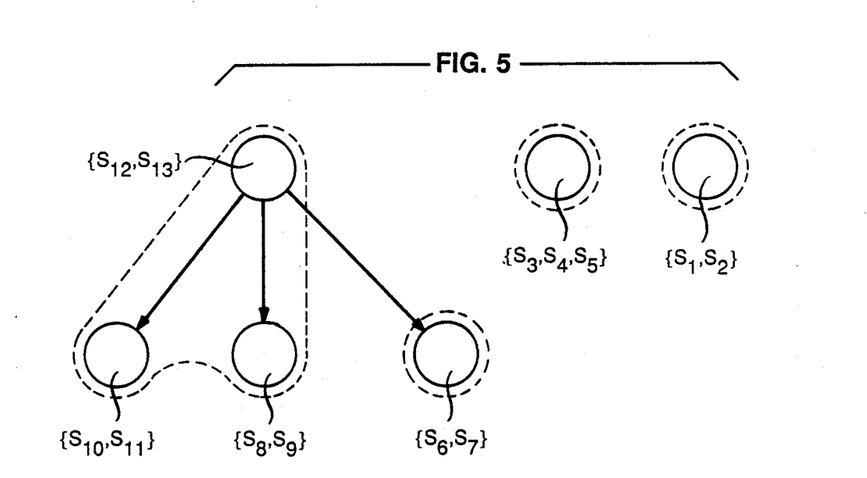
FIG. 5 is a graph illustrating a technique for forming interconnections in accordance with a still further embodiment of the invention.

A third approach effects a balance between the need for minimizing additional parasitic loading and minimizing the number of additional conductors. This approach is illustrated in the graph of FIG. 5 and the resulting circuit illustrated in FIG. 6. This technique recognizes that, in addition to sharing conductors between adjacent sets of conductors, the sets of conductors can be physically located in a manner which reduces parasitic loading. The location of the conductors is based on the particular components to which the conductors extend. In particular, it is recognized that a shared conductor between two sets of conductors need be connected to no more than the largest number of components coupled to a set if and only if the set of components visted by one set of conductors is a subset of the set of components visted by the adjacent set of conductors which shares the conductor.

Referring back to FIG. 1, it will be noted that the set of conductors $\{S_{12}$ and $S_{13}\}$ is physically connected to the greatest number of components ($C_0$, $C_2$ and $C_3$). The sets of conductors $\{S_{10}, S_{11}\}$, $\{S_8, S_9\}$ and $\{S_6, S_7\}$ are all coupled between subsets of the components connected to $\{S_{12}, S_{13}\}$. The sets of conductors $\{S_1, S_2\}$ and $\{S_3, S_4, S_5\}$ are not connected between any subset of components of $\{S_{12}, S_{13}\}$. Consequently, a graph such as that shown in FIG. 5 can be constructed where each circle represents a set of conductors as indicated therein. The circle representing $\{S_{12}, S_{13}\}$ is placed at the top and arrows are drawn to the three circles including the set of conductors connected to subsets of the components connected by $\{S_{12}, S_{13}\}$. The circles representing sets $\{S_3, S_4, S_5\}$ and $\{S_1, S_2\}$ are isolated since they do not connect to any subset of any other conductors. The choice is then made to combine $\{S_{12}, S_{13}\}$ with any two subsets. In this example, the sets $\{S_{10}, S_{11}\}$ and $\{S_8, S_9\}$ were chosen as indicated by the broken line, but any combination of two subsets would be appropriate. These subsets will then be placed adjacent to the set $\{S_{12}, S_{13}\}$, one on either side, with a shared conductor between adjacent sets of conductors.

Figure 6:
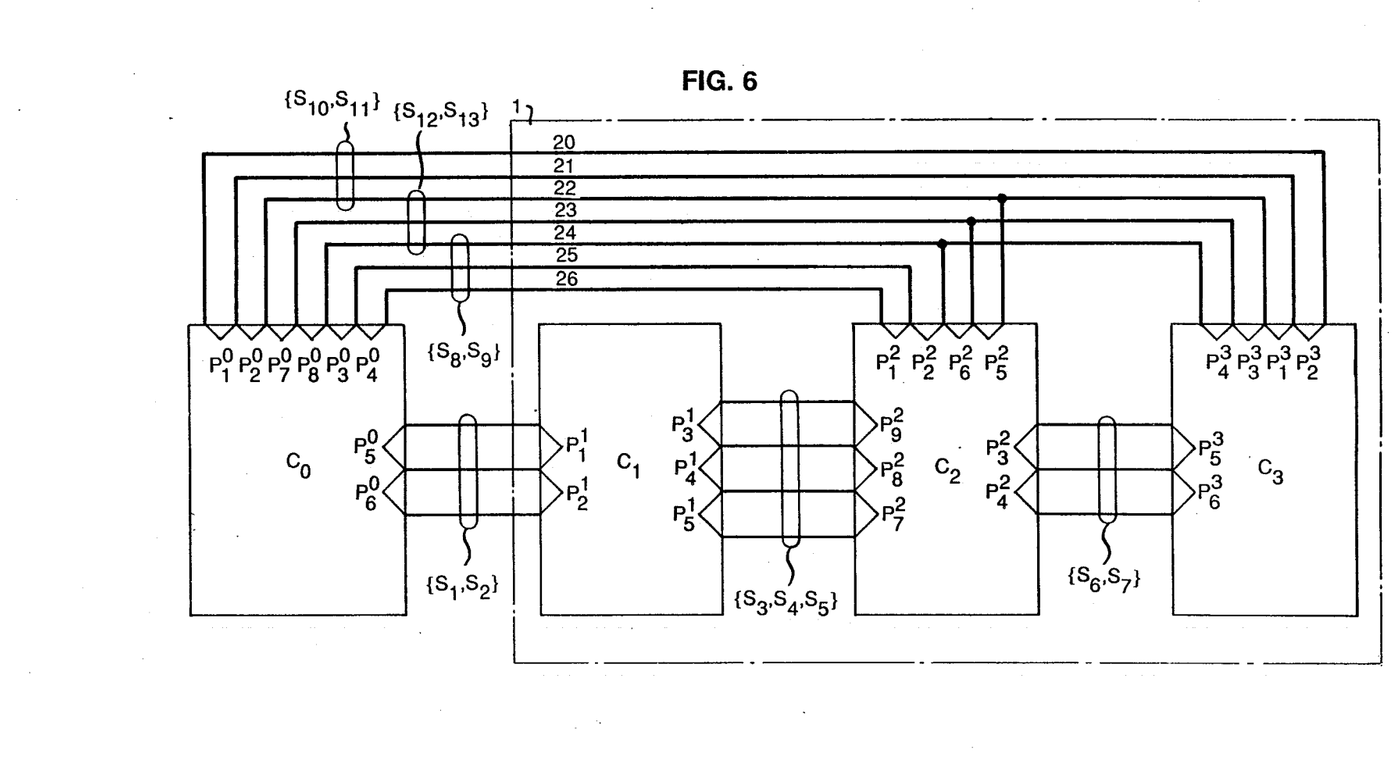
FIG. 6 is a schematic illustration of a circuit including interconnections formed in accordance with FIG. 5.

The resulting circuit is illustrated in FIG. 6. It will be noted that $\{S_{10}, S_{11}\}$ includes conductors 20 and 21 along with conductor 22 which is shared with adjacent set $\{S_{12}, S_{13}\}$. Adjacent set $\{S_{12}, S_{13}\}$ includes shared conductor 22, conductor 23, and conductor 24 which is shared with adjacent set $\{S_8, S_9\}$. Set $\{S_8, S_9\}$ includes shared conductor 24 and conductors 25 and 26. Sets $\{S_1, S_2\}$, $\{S_3, S_4, S_5\}$, and $\{S_6, S_7\}$ each include an additional conductor which is not shared with any other set of conductors. As before, in the event of a defect on any conductor, appropriate steering of the ports onto the remaining conductors will save the circuit from being scrapped. However, the number of components which must be visited by shared conductors has been also been reduced, and, consequently, parasitic loading has also been reduced compared with the circuit of FIG. 4.

Figure 7:
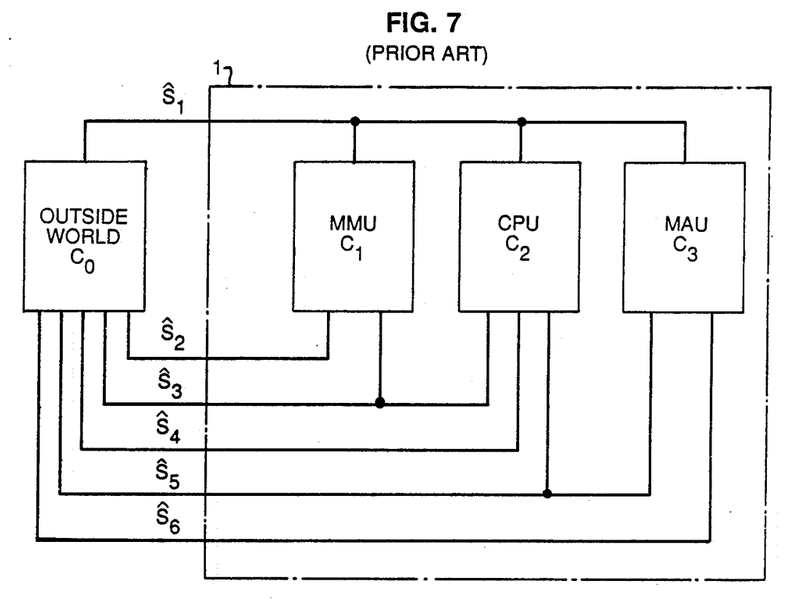
FIG. 7 is a schematic illustration of a circuit including interconnections in accordance with a further prior art scheme.
Figure 8:
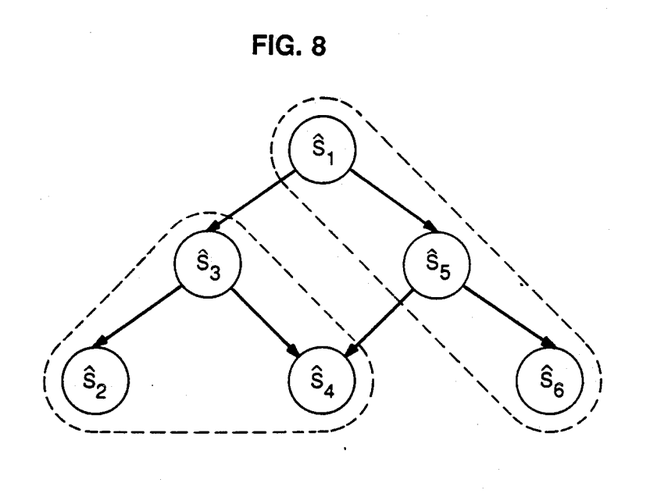
FIG. 8 is a graph illustrating a technique for forming interconnections in accordance with yet another embodiment of the invention.
Figure 9:
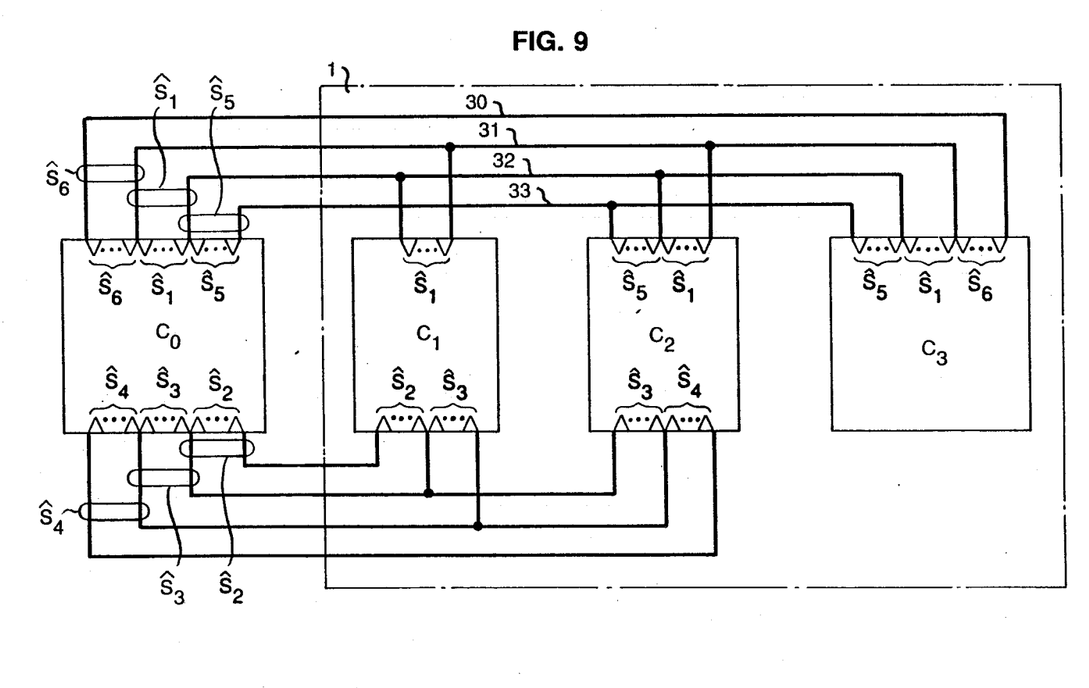
FIG. 9 is a schematic illustration of a circuit including interconnections formed in accordance with FIG. 8.

FIGS. 7–9 illustrate how the technique shown in FIGS. 5 and 6 can be applied to more complex circuits. FIG. 7 is an example of a prior art microprocessor circuit with a memory management unit (MMU) represented as $C_1$, a central processing unit (CPU) represented as $C_2$ and a math acceleration unit (MAU) represented as component $C_3$, all interconnected on a substrate 1, and to the outside world represented by $C_0$. In this example, each set of conductors coupled to a particular set of components is represented by a single conductor with the designation, $\hat{S}_1$-$\hat{S}_6$, but is will be appreciated that each set includes a multitude of conductors.

FIG. 8 represents the graph set up in a manner similar to FIG. 5 in order to place the conductors. The top level is occupied by $\hat{S}_1$ since that set of conductors extends to four components ($C_0$-$C_3$). The next level is occupied by $\hat{S}_3$ and $\hat{S}_5$ which both couple the same number (3) of subsets of components which are coupled by $\hat{S}_1$. The lowest level is occupied by $\hat{S}_2$, $\hat{S}_4$ and $\hat{S}_6$ which each couple only 2 components that are coupled by $\hat{S}_1$.

It will be recalled that a first set of conductors is preferably grouped with two other sets which connect subsets of the components connected to the first set. Consequently, several possible choices exist for the sets illustrated in FIG. 8. For illustrative purposes, $\hat{S}_1$ is grouped with $\hat{S}_5$ & $\hat{S}_6$, while $\hat{S}_3$ is grouped with $\hat{S}_2$ and $\hat{S}_4$.

The resulting circuit with redundancy is illustrated in FIG. 9. Here for example, the set of conductors $\hat{S}_6$ includes conductor 30, some additional conductors (not shown), and conductor 31 which is shared with the set of conductors $\hat{S}_1$. $\hat{S}_1$ includes shared conductor 31, the additional conductors in the set (not shown) and conductor 32 which is shared with set $\hat{S}_5$. The latter set, in addition to the shared conductor 32, includes the normal conductors in the set, one of which is illustrated as conductor 33. Sets $\hat{S}_2$, $\hat{S}_3$, and $\hat{S}_4$ are similarly arranged.

Various additional modifications will become apparent to those skilled in the art. All such variations which basically rely on the teachings through which the invention has advanced the art are properly considered within the scope of the invention.

I claim:
1. A circuit comprising:
an interconnection medium comprising a substrate and plurality of conductors over a major surface of said substrate, said conductors being formed in a manner which provides electrical interconnection between components mounted to said medium;
characterized in that said medium includes conductors between the same components which are in addition to the conductors needed to interconnect the components such that alternate conducting means are established between components in the event of a fault in one of the conductors needed to interconnect the components, and the conductors providing electrical interconnection between components are arranged in at least two sets with a first set of conductors coupled to a first set of components and a second set of conductors coupled to a second set of components, and there is further provided a shared conductor located between the two sets and which physically extends to both sets of conductors.

2. The circuit according to claim 1 wherein the set of conductors on one side of the shared conductor is coupled to a set of components which is a subset of the components coupled to the set of conductors on the other side of the shared conductor.

3. The circuit according to claim 2 wherein a set of conductors coupled to the largest set of components is physically located between two sets of conductors coupled to subsets of said components.

4. The circuit according to claim 1 further comprising steering means for providing electrical connection via the additional conductors in the event of a fault in one of the conductors.

* * * * *